Jan. 5, 1926.
A. D. RAMSEY
1,568,385
TROUBLE DETECTOR FOR GENERATORS
Filed April 13, 1923
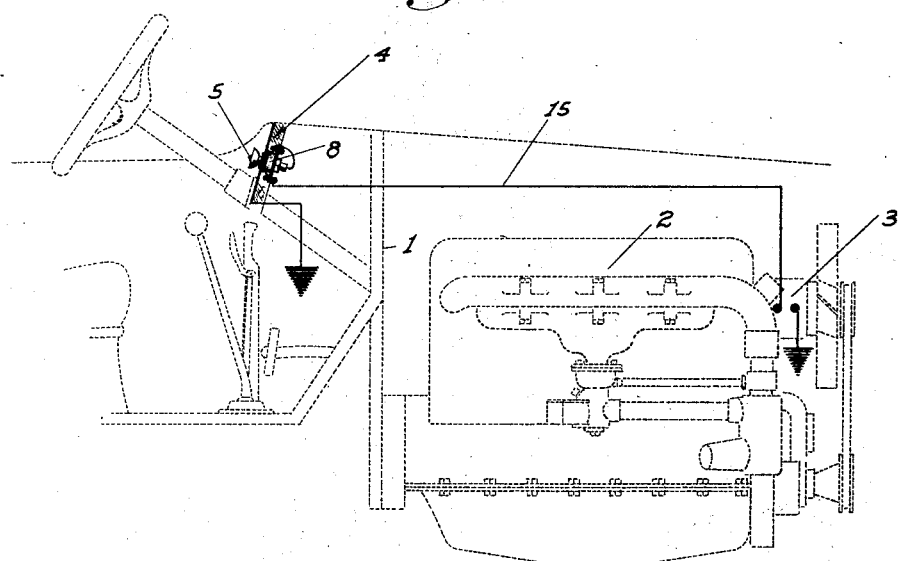
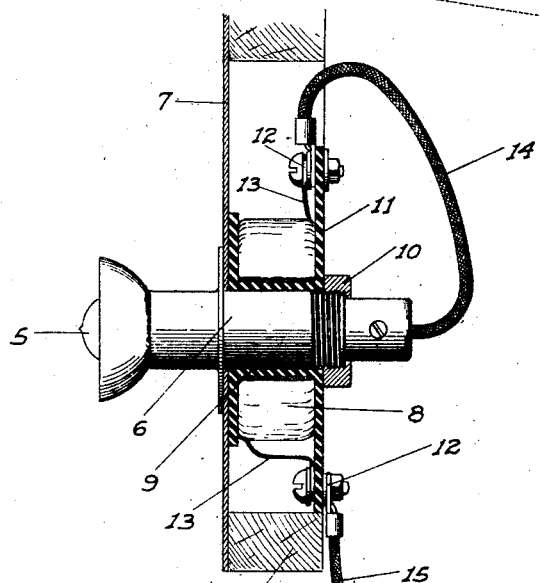
INVENTOR.
A. D. Ramsey
BY
ATTORNEY Patented Jan. 5, 1926.

1,568,385

UNITED STATES PATENT OFFICE.

ARCHIBALD D. RAMSEY, OF TUOLUMNE, CALIFORNIA.

TROUBLE DETECTOR FOR GENERATORS.

Application filed April 13, 1923. Serial No. 631,746.

*To all whom it may concern:*

Be it known that I, ARCHIBALD D. RAMSEY, a citizen of the United States, residing at Tuolumne, county of Tuolumne, State of California, have invented certain new and useful Improvements in Trouble Detectors for Generators; and I do declare the following to be a full, clear, and exact description of the same, reference being had to the accompanying drawings, and to the characters of reference marked thereon, which form a part of this application.

This invention relates to a warning or signal means for use in connection with an electric generator, to warn and indicate to the attendant or operator when the voltage of the current produced by the generator has risen above normal to such a point that burning out of the generator is likely.

My detector is especially intended for use in connection with motor-vehicle generators of that type which have make-and-break contact switches included in their make-up.

It is a well-known fact that in all such automobile generator units certain conditions increase the voltage of the current output to such a point that the generator is rapidly burned out.

These conditions are:—1. Loose battery connections. 2. Contact fails on the generator contact switch. 3. Loose electrical connection anywhere in the circuit between the generator and battery.

As this type of generator structure is usually a closed unit so that the car driver cannot readily inspect the parts of the unit, and since the average driver is very seldom electrician enough to know what would give trouble, or recognize the trouble giving features if he saw them, it very frequently happens that the generators burn out before the owner is even aware that anything is wrong, necessitating expensive repairs if not replacement of the entire unit.

The principal object of my invention therefore is to avoid the burning out of the generators by providing a visible, or possibly audible, signal member within sight or hearing of the driver, which will be actuated automatically by the generator when the latter is running and any of the above named high-voltage producing conditions exist.

It is to be understood of course that my invention only gives the signal, and does not cure nor stop the defects in the generating system. This must be done by the driver or by some one else competent to attend to the matter, but the signal being given, the driver will at once know that the system needs attention, and if not convenient to give it this attention at the time, he can ground the generator temporarily.

A further object of the invention is to produce a simple and inexpensive device and yet one which will be exceedingly effective for the purposes for which it is designed.

These objects I accomplish by means of such structure and relative arrangement of parts as will fully appear by a perusal of the following specification and claims.

In the drawings similar characters of reference indicate corresponding parts in the several views.

Fig. 1 is a section outline of the front portion of an automobile chassis, showing my detector as installed thereon.

Fig. 2 is an enlarged view, partly in section, of the detector itself.

Referring now more particularly to the characters of reference on the drawings, the numeral 1 denotes in general the chassis of an automobile, having an engine 2, a generator 3 driven in connection therewith, and a dash board 4.

My detector comprises an electric bulb or lamp 5, having a voltage the same as the generator, mounted in an ordinary tubular dash-light fixture 6, which is mounted on and projects outwardly of the dashboard 4, being grounded with the engine or metal frame of the car, as by means of the metal sheathing 7 with which some dashboards are covered.

Mounted about the fixture 6 behind the sheathing 7 is a resistance coil 8 having a fiber core-tube 9 which surrounds the fixture and is held in place thereon by the usual nut 10 on the latter.

Of course it is not necessary for the successful operation of the detector that the coil shall surround the light fixture, but this is the simplest way in which to make a compact unit of the device.

The coil is faced with a fiber plate 11 which serves as a support for binding posts 12 to which are connected the wires 13 from the opposite ends of the coil, and from one of which binding posts a wire 14 leads to the lamp 5 while from the other a wire 15 leads to one terminal of the generator 3, which as usual is grounded.

The lamp is therefore in circuit with the generator, with the coil interposed in the line, the resistance of said coil being such that as long as the voltage of the generator, usually six, is normal, the lamp will not be lit, but as soon as the voltage rises above a certain danger limit, the lamp will glow, and will give a visible warning to the driver that there is trouble in the generator system.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A high voltage warning signal comprising a tube of insulating material, a resistance coil wound about the tube, a tubular light holding fixture mounted in the insulating tube, one end of the coil being adapted for connection to a source of current, electrical connection means between the fixture and the other end of the coil, and means for enabling the fixture to be maintained in clamping engagement with a metal element.

2. A high voltage warning signal comprising a tube of insulating material, an outwardly projecting flange formed with the tube at one end thereof, a resistance coil about the tube beyond the flange, a tubular light holding fixture slidably mounted in the insulation tube, an annular flange on the fixture adjacent the tube flange, one end of the coil being adapted for connection to a source of current, electrical connection means between the fixture and the other end of the coil, and means for securing the fixture to the tube and at the same time causing the fixture and tube flanges to approach each other, whereby if a metal element is interposed between said flanges said element may be clampingly engaged with the fixture flange.

3. A structure as in claim 2 in which said last named means comprises a nut removably screwed onto the inner end of the fixture and adapted to press against the adjacent end of the tube to advance the latter along the fixture.

In testimony whereof I affix my signature.

ARCHIBALD D. RAMSEY.